United States Patent
Lee

(10) Patent No.: US 12,427,966 B2
(45) Date of Patent: Sep. 30, 2025

(54) ELECTROMECHANICAL BRAKE EMERGENCY BRAKING DEVICE FOR VEHICLE AND EMERGENCY BRAKING METHOD

(71) Applicants: Hyundai Motor Company, Seoul (KR); Kia Corporation, Seoul (KR)

(72) Inventor: Kyu Hwan Lee, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 197 days.

(21) Appl. No.: 18/387,364

(22) Filed: Nov. 6, 2023

(65) Prior Publication Data
US 2025/0033622 A1 Jan. 30, 2025

(30) Foreign Application Priority Data
Jul. 24, 2023 (KR) .......................... 10-2023-0095760

(51) Int. Cl.
*B60T 13/74* (2006.01)
*B60T 8/94* (2006.01)

(52) U.S. Cl.
CPC .............. *B60T 13/741* (2013.01); *B60T 8/94* (2013.01); *B60T 2270/402* (2013.01)

(58) Field of Classification Search
CPC .... B60T 13/741; B60T 8/94; B60T 2270/402; B60T 13/662; B60T 13/745; B60T 17/22; B60T 17/221; B60T 7/02; B60T 13/12; B60T 13/58; B60T 13/746; B60Y 2306/13; B60Y 2400/81; B60Y 2400/90
See application file for complete search history.

(56) References Cited

U.S. PATENT DOCUMENTS

| 7,837,278 | B2 | 11/2010 | Nilsson |
| 8,348,024 | B2 | 1/2013 | Yamaguchi et al. |
| 11,338,780 | B2* | 5/2022 | Konno ..................... B60T 7/042 |
| 2008/0150351 | A1 | 6/2008 | Ruffer et al. |
| 2018/0362008 | A1 | 12/2018 | Farres et al. |
| 2020/0317170 | A1* | 10/2020 | Konno .................. B60T 13/161 |
| 2020/0384963 | A1 | 12/2020 | Mellings et al. |

FOREIGN PATENT DOCUMENTS

| KR | 101238956 B1 | 3/2013 |
| KR | 102082378 B1 | 2/2020 |

* cited by examiner

*Primary Examiner* — Xiao En Mo
(74) *Attorney, Agent, or Firm* — Fox Rothschild LLP

(57) ABSTRACT

An electro mechanical brake (EMB) emergency braking device includes an EMB driving unit such as an electric motor that generates driving force; an emergency braking driving unit that generates emergency braking driving force, and may include a pneumatic actuator; and braking force generating unit that generates braking force by receiving one of the driving force or the emergency braking driving force, where the EMB driving unit and the emergency braking driving unit may generate the driving force or the emergency braking driving force from different power sources.

20 Claims, 6 Drawing Sheets

ELECTROMECHANICAL BRAKE EMERGENCY BRAKING DEVICE FOR VEHICLE AND EMERGENCY BRAKING METHOD

CROSS-REFERENCE TO RELATED APPLICATION(S)

This application claims under 35 U.S.C. § 119 (a) the benefit of Korean Patent Application No. 10-2023-0095760 filed on Jul. 24, 2023 in the Korean Intellectual Property Office, the entire contents of which are incorporated herein by reference.

BACKGROUND

1. Technical Field

The present disclosure relates to an electromechanical brake (EMB) emergency braking device for a vehicle and an emergency braking method.

2. Description of the Related Art

A brake system applied to a vehicle includes a hydraulic brake system and an electromechanical brake (EMB) system. The hydraulic brake system is a system which mechanically generates braking force using hydraulic pressure. The EMB system is a braking system for generating braking force using an electric actuator instead of hydraulic pressure. Compared to the hydraulic brake system, the EMB system is eco-friendly and has excellent braking response and control performance, so the number of vehicles to which the EMB system is applied is increasing.

However, the EMB system typically has a complicated system configuration electronically and electrically, and may have a stability problem against failure.

The hydraulic brake system may stop the vehicle by generating braking force through a driver pressing a brake pedal, even when power to the vehicle is cut off or some parts of a booster have failed.

In contrast, the EMB system may cause a serious problem in which a vehicle is unable to brake due to a problem with a power supply source, electrical noise, a software bug, or the like.

SUMMARY

The present disclosure provides an electromechanical brake (EMB) emergency braking device for a vehicle and an emergency braking method, for performing emergency braking, when an EMB device is in an inoperable state.

According to an aspect of the present disclosure, an electromechanical brake (EMB) emergency braking device may include: an EMB driving unit generating driving force; an emergency braking driving unit generating emergency braking driving force; and a braking force generating unit generating braking force by receiving one of the driving force or the emergency braking driving force, wherein the EMB driving unit and the emergency braking driving unit may generate the driving force or the emergency braking driving force from different power sources.

The EMB driving unit may generate the driving force using electrical energy as a power source, and the emergency braking driving unit may generate the emergency braking driving force using pressure of fluid stored in a pressure storage unit.

The EMB driving unit may be an electric motor, and the emergency braking driving unit may include a pneumatic actuator.

The braking force generating unit may include a power transmission unit connected to the EMB driving unit and the emergency braking driving unit.

The braking force generating unit may include a power transmission unit receiving one of the driving force or the emergency braking driving force from the EMB driving unit or the emergency braking driving unit.

The power transmission unit may be directly connected to the EMB driving unit and the emergency braking driving unit, and the EMB driving unit and the emergency braking driving unit may not be directly connected.

The power transmission unit may be rotated by one of the EMB driving unit or the emergency braking driving unit, and the other of the EMB driving unit or the emergency braking driving unit may rotate without load according to the rotation of the power transmission unit.

A pressure storage unit storing pressure of fluid, a solenoid valve provided between the pressure storage unit and the emergency braking driving unit, an input unit opening and closing the solenoid valve by receiving a 'user's desire to undertake emergency braking, and an automatic emergency braking unit controlling the pressure of fluid transmitted to the emergency braking unit by controlling the solenoid valve, may be included, wherein the solenoid valve may be controlled by the input unit or the automatic emergency braking unit.

A receiving unit receiving at least one of brake pedal stroke information, whether or not EMB brake devices provided in a vehicle have failed, a location of the EMB brake device that has failed, and required braking force to be generated by the EMB braking device that has failed, may further be included, wherein the required braking force may be braking force to be generated by the EMB braking device in which the failure has occurred, received from an EMB controller.

The automatic emergency braking unit may generate the required braking force to a wheel provided with an EMB braking device in which a failure has occurred, by controlling the emergency braking driving unit by controlling the solenoid valve.

A display unit for visually or audibly conveying failure occurrence information of the EMB braking device to a user may further be included.

A power supply unit supplying power so that the display unit can visually or audibly convey failure occurrence information of the EMB braking device to a user may further be included.

The EMB driving unit may operate by receiving power, other than the power of the power supply unit.

A vehicle may include the above-described electromechanical brake (EMB) emergency braking device.

According to another aspect of the present disclosure, an electromechanical brake (EMB) emergency braking method may include steps of: confirming whether or not an electromechanical brake (EMB) braking device has failed; and generating braking force using an EMB driving unit, or generating braking force using an emergency braking driving unit, according to whether or not the electromechanical brake (EMB) braking device has failed, where generating the braking force is performed in at least one of an automatic emergency braking mode or a manual emergency braking mode, and the emergency braking driving unit is operable using pressure of fluid.

The automatic emergency braking mode may further include receiving vehicle driving information in the operation of performing the emergency braking.

The driving information may include at least one of brake pedal stroke information, whether or not the EMB braking devices provided in a vehicle have failed, a location of the EMB braking device that has failed, and required braking force to be generated by the EMB braking device that has failed.

The automatic emergency braking mode, based on the driving information, may generate the required braking force in the EMB braking device in which the failure has occurred by using the emergency braking driving unit.

The manual emergency braking mode, in an operation of performing emergency braking, may further include operations of: notifying a user of emergency braking information and receiving user's desire to brake, wherein when the 'user's desire to brake is received, braking force may be immediately generated using the emergency braking driving unit.

The operation of notifying a user of the emergency braking information may be performed by a display unit receiving power from a power supply unit not supplying power to the EMB driving unit, and displaying the emergency braking information to the user.

When the vehicle is started, an emergency braking preparation operation of charging and storing pressure of fluid in a pressure storage unit up to a preset pressure may further be included.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
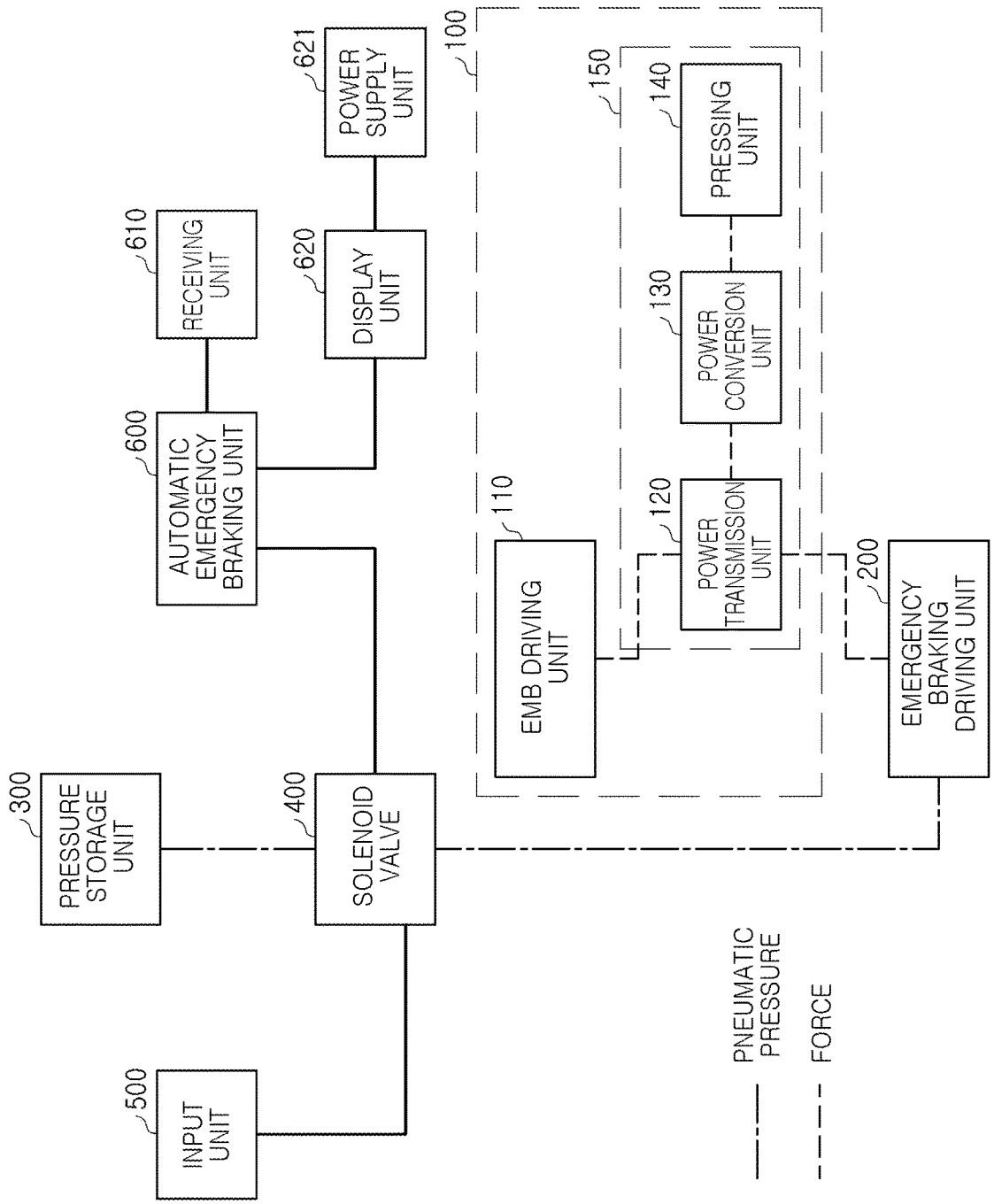
FIG. 1 is a block diagram of an electromechanical brake (EMB) emergency braking device according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, the present disclosure will be described in detail with reference to the accompanying drawings. In adding reference numerals to elements of each of the drawings, although the same elements are illustrated in other drawings, like reference numerals may refer to like elements. Since the present disclosure can make various changes and have various embodiments, specific embodiments are illustrated in the drawings and described in detail. However, this is not intended to limit the present disclosure to specific embodiments, and should be understood to include all modifications, equivalents, and substitutes included in the spirit and scope of the present disclosure.

Terms such as "first,"," "second,"," and the like, may be used to describe various components, but the components should not be limited by the terms. These terms are only used for the purpose of distinguishing one component from another component. For example, a first element may be termed a second element, and similarly, a second element may be termed a first element, without departing from the scope of the present disclosure.

Terms used in this application are only used to describe specific embodiments, and are not intended to limit the present disclosure. Singular expressions include plural expressions unless the context thereof is clearly dictated otherwise.

Unless defined otherwise, all terms used herein, including technical or scientific terms, have the same meaning as commonly understood by one of ordinary skill in the art to which the present disclosure belongs. Terms such as those defined in commonly used dictionaries should be interpreted as having a meaning consistent with the meaning in the context of the related art, and unless explicitly defined in this application, they should not be interpreted in an ideal or excessively formal meaning.

Hereinafter, with reference to the accompanying drawings, preferred embodiments of the present disclosure will be described in more detail.

FIG. 1 is a block diagram of an EMB emergency braking device for a vehicle and an emergency braking method according to an embodiment of the present disclosure.

An EMB emergency braking device according to an embodiment of the present disclosure may include an EMB braking device 100, an emergency braking driving unit (or "driver") 200, a pressure storage unit 300, a solenoid valve 400, an input unit 500, and an automatic emergency braking unit 600.

For example, the EMB braking device 100 is hardware, and may be an electric motor, for example. The emergency braking driving unit/driver 200 is also hardware, and may include a pneumatic actuator, for example.

The EMB braking device 100 may be configured to be mounted on an individual wheel provided in a vehicle, to generate braking force. The EMB braking device 100 may include an EMB driving unit 110 and a braking force generating unit 150 including a power transmission unit 120, a power conversion unit 130, and a pressing unit 140.

The EMB driving unit 110 may provide driving force for generating braking force in the braking force generating unit 150. The EMB driving unit 110 may be an electric motor generating braking force by receiving electricity, and the driving force may be force generated by rotational movement generated by the motor.

The braking force generating unit 150 may generate braking force to a vehicle by transforming the rotational movement generated by the EMB driving unit 110 into linear movement. The braking force generating unit 150 may include a power transmission unit 120, a power conversion unit 130, and a pressing unit 140.

The power transmission unit 120 may receive driving force due to the rotational movement of the EMB driving unit 110. The power transmission unit 120 may be a gear. The driving force generated by the rotational movement of the EMB driving unit 110 may be provided in a first gear 111 provided in the EMB driving unit 110 and the power transmission unit 120, and may be transmitted to the braking force generating unit 150 through a second gear 121 connected to the first gear 121.

The power conversion unit 130 may convert the driving force of the rotational movement transmitted by the power transmission unit 120 into a linear movement. For example, the power conversion unit 130 may be a ball screw.

One end of the power conversion unit 130 may be connected to the power transmission unit 120 transmitting the driving force of the rotational movement, and the other end thereof may be connected to a pressing unit 140.

The pressing unit 140 may be combined with the power conversion unit 130 to move linearly, and press a brake disc (not shown) to generate braking force. For example, the pressing unit 140 may include at least one brake pad. In addition, the pressing unit 140 may be two brake pads disposed opposite to each other with a brake disk interposed therebetween.

The EMB braking device 100 may generate braking force by transmitting the driving force of the rotational movement generated by the EMB driving unit 110 to the braking force generating unit 150. More specifically, the EMB braking device 100 may transmit the driving force of the rotational movement generated by the EMB driving unit 110 to the braking force generating unit 150 through a power transmission unit 120. The braking force generating unit 150 may convert the driving force of rotational movement received through the power transmission unit 120 into driving force of linear movement through the power conversion unit 130. The braking force generating unit 150 may generate braking force to a vehicle by pressing a brake disk by adjusting a location of the pressing unit 140, using the driving force converted by the power conversion unit 130.

Here, the EMB braking device 100 may be individually provided on each wheel, and the EMB braking device 100 provided on each wheel may be individually controlled by an EMB controller (not shown) to generate braking force.

An EMB emergency braking device according to an embodiment of the present disclosure relates to a device that performs emergency braking when normal operation is difficult when a problem with electricity or communication occurs in the EMB braking device 100, and generating braking force in a normal operating state of the EMB, is a non-essential part, and thus a detailed description thereof will be omitted.

In a situation in which braking force cannot be normally generated using the EMB driving unit 110 due to a problem with a vehicle's power, noise generation, or software in the EMB braking device 100, the emergency braking driving unit 200 may generate emergency braking driving force to generate braking force.

The emergency braking driving unit 200 may generate driving force using the pressure of fluid. The emergency braking driving unit 200 may be operated by a power source different from that of the EMB driving unit 110. For example, the EMB driving unit 110 may operate by receiving electrical energy, and the emergency braking driving unit 200 may operate with fluid pressure energy stored in the pressure storage unit 300 instead of electrical energy.

Hereinafter, although it is exemplarily illustrated that the emergency braking driving unit 200 is driven by pneumatic pressure, it is not limited thereto and various pressurized fluids such fluid pressurized with hydraulic pressure may be applied.

The emergency braking driving unit 200 may generate emergency braking driving force by receiving the pressure of fluid stored in the pressure storage unit. For example, the emergency brake driver 200 may include a pneumatic actuator connected to the pressure storage unit. The emergency braking driving unit 200 may generate emergency braking driving force using a pneumatic actuator connected to a pneumatic tank in which air of a preset pressure is stored.

The emergency braking driving unit 200 may further include a third gear 210 on one side of a rotation shaft of the pneumatic actuator, and the third gear 210 may be connected to the second gear 121 of the power transmission unit 120, and may transmit emergency braking driving force to the braking force generating unit 150 through the power transmission unit 120.

The emergency brake driving unit 200 may include a valve in a connection portion of the pressure storage unit. The emergency braking driving unit 200 may generate emergency braking driving force by opening and closing a valve.

For example, when the valve is opened, the emergency braking driving unit 200 may receive air pressure from the pressure storage unit to generate emergency braking driving force, and when the valve is closed, the emergency braking driving force may not be received from the pressure storage unit to generate emergency braking driving force.

In addition, the emergency braking driving unit 200 may adjust an amount of emergency braking driving force generated by adjusting a degree of opening of the valve.

The valve provided in the emergency braking driving unit 200 and the connection portion of the pressure storage unit may be a solenoid valve 400, and the solenoid valve 400 may be connected to an input unit 500 and an automatic emergency braking unit 600.

The solenoid valve 400 may open or close according to a 'user's desire to undertake emergency braking transmitted through the input unit 500, or adjust the degree of closing or opening of the automatic emergency braking unit 600 according to the amount of emergency braking driving force required according to a driving state.

The input unit 500 may be a device for receiving a user's desire to undertake emergency braking. For example, the input unit 500 may be a separate switch provided in a steering wheel, control cluster, or the like, of a vehicle.

The input unit 500 may be connected to the solenoid valve 400, and when a user's desire to undertake emergency braking is received, the input emergency braking may be performed by opening the solenoid valve 400. For example, when emergency braking is required due to a failure of the EMB braking device 100, the user may operate a separate switch provided on the steering wheel, control cluster, or the like, of the vehicle.

More specifically, the separate switch may be a push button. In the case in which the separate switch is a push button, the user may input the user's desire to undertake emergency braking by pressing the push button.

When the user presses the push button, the solenoid valve 400 may be forcibly opened to provide air pressure to the emergency braking driving unit 200, and the emergency braking driving unit 200 may generate braking force by transmitting emergency braking force to the braking force generating unit 150.

The automatic emergency braking unit 600 may monitor a driving state of the vehicle, and control an amount of emergency braking driving force. In addition, the automatic emergency braking unit 600 may be connected to the solenoid valve 400 together with the input unit 500.

The receiving unit 610 may receive information about driving conditions, such as brake pedal stroke information, brake pedal effort, steering angle, driving speed, and the like. In addition, the receiving unit 610 may be connected to the EMB controller to determine whether the EMB brake devices provided in the vehicle have failed, a location of the EMB brake device that has failed, and required braking force to be generated by the EMB brake device that has failed.

Here, the required braking force may be braking force to be generated in the EMB braking device in which the failure has occurred.

The receiving unit 610 may be connected to sensors installed in a vehicle using a network provided in the vehicle, to receive information regarding a driving state of the vehicle. For example, the receiving unit 610 may receive brake pedal stroke information from a brake pedal sensor using a controller area network (CAN) network of a vehicle.

In addition, the receiving unit 610 may be connected to an EMB controller using a controller area network (CAN) network or a separate network, and may receive location information of a failed EMB from the EMB controller. In addition, when a failure has occurred in a portion of the EMB braking devices 100 provided in the vehicle, the receiving unit 610 may receive braking force to be generated by the failed EMB.

The automatic emergency braking unit 600 may adjust the emergency braking driving force by adjusting the solenoid valve 400 based on the information received from the receiving unit 610.

The automatic emergency braking unit 600 may receive location information of a failed EMB and braking force information to be generated by the failed EMB through the receiving unit 610.

The automatic emergency braking unit 600 may generate braking force required for a failed EMB based on the received braking force information, so that the vehicle can stably drive despite a failure of the EMB braking device 100.

The display unit 620 may visually or audibly notify a user that a problem has occurred in the EMB braking device 100.

For example, the display unit 620 may be a display included in a control cluster of a vehicle or audio of a vehicle. When a problem occurs in the EMB braking device 100, the display unit 620 may notify the occurrence of a failure along with the location of the EMB braking device 100 where the problem has occurred through a display. In addition, the display unit 620 may notify a user that a failure of the EMB braking device 100 has occurred using audio, and may induce the user to manually perform EMB emergency braking using the input unit 500 if necessary.

Here, the display unit 620 may be electrically connected to a separate power supply unit 630 for EMB emergency braking. Thereby, even when a problem occurs in electrical elements of an entire vehicle, the display unit 620 may notify a user that a problem has occurred in the EMB braking device 100, and may induce the user to manually perform EMB emergency braking using the input unit 500 if necessary.

Components of the EMB braking device 100 may be connected wired or wirelessly to exchange information. For example, data may be exchanged using a communication means such as Ethernet, Media Oriented Systems Transport (MOST), Flexray, Controller Area Network (CAN), Local Interconnect Network (LIN), Internet, LTE, 5G, Wi-Fi, Bluetooth, Near Field Communication (NFC), Zigbee, Radio Frequency (RF), and the like.

Figure 2:
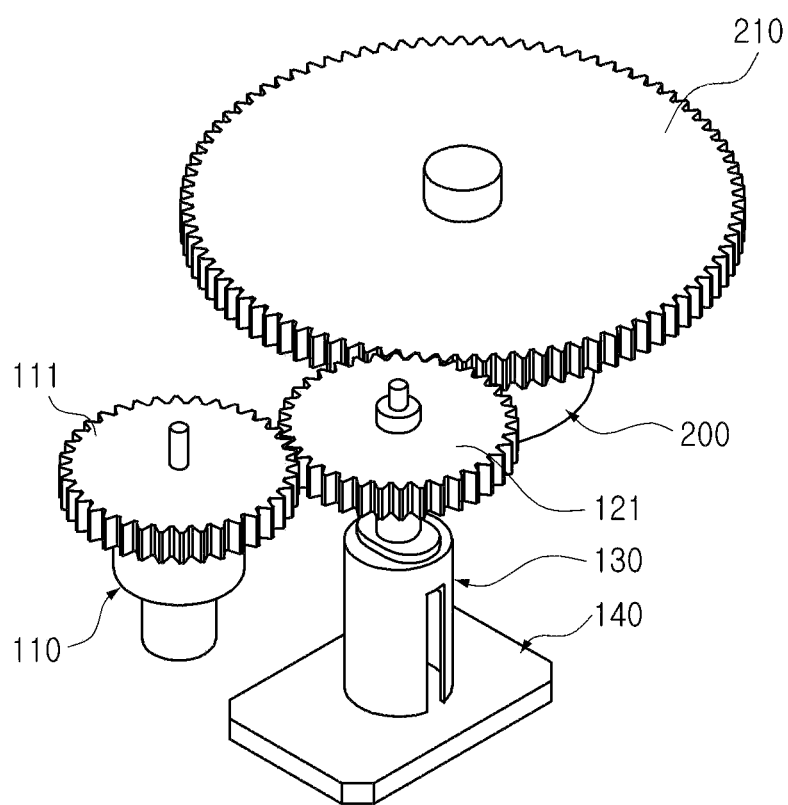
FIG. 2 is a perspective view of an EMB braking device and an emergency braking driving unit according to an embodiment of the present disclosure.
Figure 3:
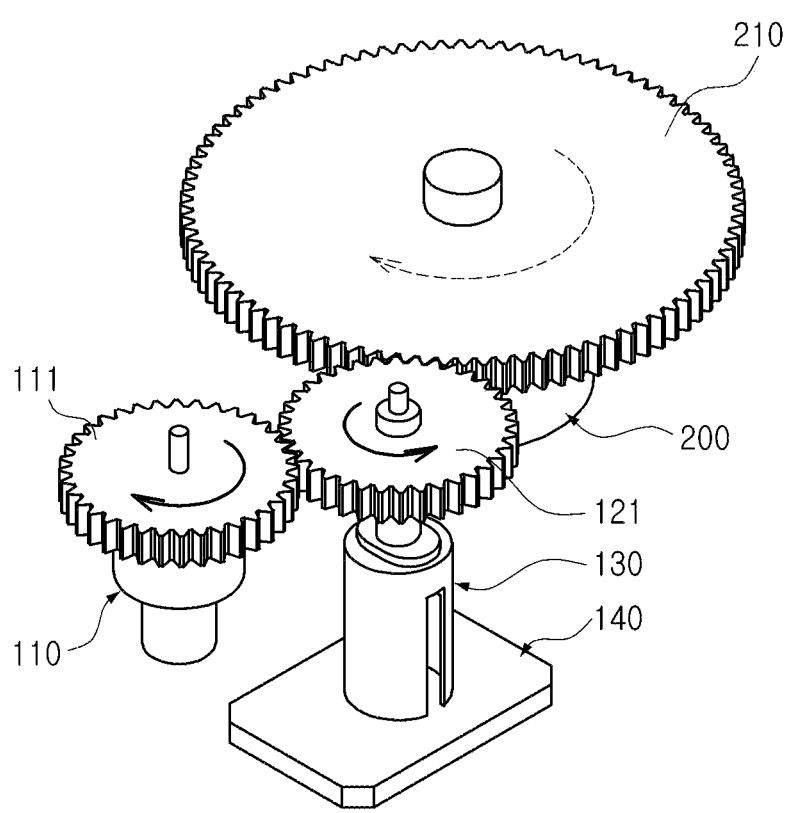
FIG. 3 is a diagram exemplarily illustrating force acting when braking force is generated by an EMB driving unit according to an embodiment of the present disclosure.
Figure 4:
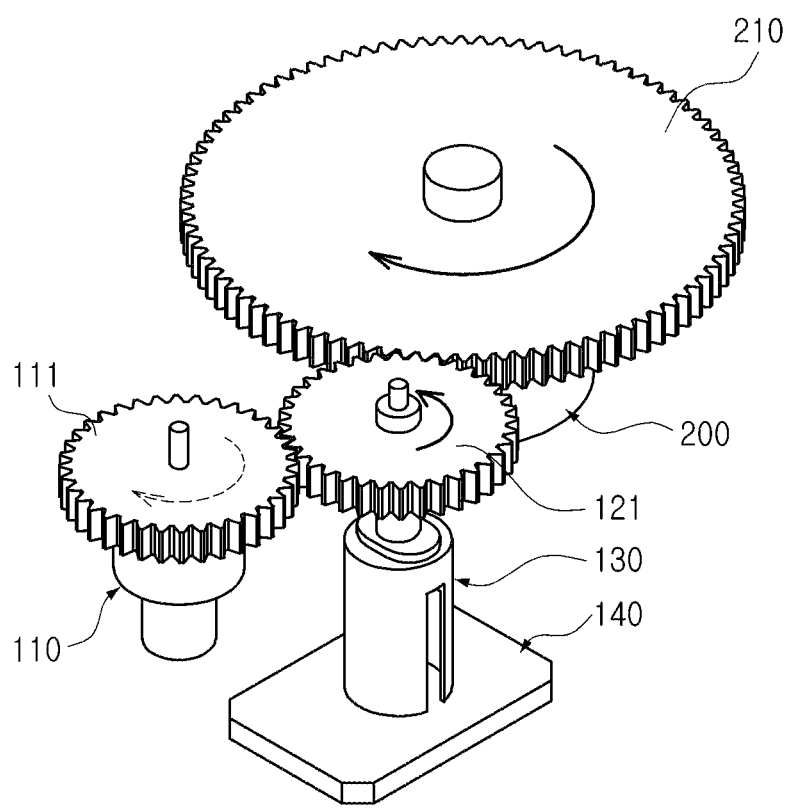
FIG. 4 is a diagram illustratively illustrating force acting when braking force is generated by an emergency braking driving unit according to an embodiment of the present disclosure.

FIG. 2 is a perspective view of an EMB braking device 100 and an emergency braking driving unit 200 according to an embodiment of the present disclosure, FIG. 3 is a diagram exemplarily illustrating force acting when braking force is generated by the EMB driving unit 110 according to an embodiment of the present disclosure, and FIG. 4 is a diagram exemplarily illustrating force acting when braking force is generated by the emergency braking driving unit 200 according to an embodiment of the present disclosure.

A process of generating braking force in an EMB emergency braking device according to an embodiment of the present disclosure will be described with reference to FIGS. 2 to 4.

Referring to FIG. 2, the braking force generating unit 150 includes an EMB driving unit 110, a power transmission unit 120 connected to the emergency braking driving unit 200 and receiving rotational kinetic energy, a power conversion unit 130 converting the rotational kinetic energy received from the driving force transmission unit 120 into linear kinetic energy, and a pressing unit 140 generating braking force by pressing a brake pad according to the linear kinetic energy converted by the power conversion unit 130.

The EMB driving unit 110 may include a second gear 121, and may be connected to a first gear 111 of the braking force generating unit 150 through the second gear 121. The emergency braking driver 200 may include a third gear 210, and may be connected to the first gear 111 of the braking force generating unit 150 through the third gear 210.

In other words, the first gear 111 of the braking force generating unit 150 may be connected to the second gear 121 of the EMB driving unit 110 and the third gear 210 of the emergency braking driving unit 200. In addition, the second gear 121 of the EMB driving unit 110 and the third gear 210 of the emergency braking driving unit 200 may be indirectly connected through the first gear 111, but may not be directly connected.

The EMB driving unit 110 may transmit driving force to the braking force generating unit 150 through the second gear 121 connected to the first gear 111, and the emergency braking driving unit 200 may transmit emergency braking driving force to the braking force generating unit 150 through the third gear 210 connected to the first gear 111.

Referring to FIG. 3, when the EMB braking device 100 is in a normal state, the braking force generating unit 150 may generate braking force by driving force generated by the EMB driving unit 110.

More specifically, the second gear 121 may be rotated by the driving force generated by the EMB driving unit 110. Since the first gear 111 of the braking force generating unit 150 is connected to the second gear 121, the second gear 121 and the first gear 111 may rotate together to receive driving force of the EMB driving unit 110. The braking force generating unit 150 may generate braking force by pressing the pressing unit 140 against a brake disk using driving force of EMB driving transmitted through the first gear 111.

Here, the third gear 210 of the emergency braking driving unit 200 connected to the first gear 111 may rotate without load. That is, the third gear 210 may rotate according to the rotation of the first gear 111 rotated by driving force of the second gear 121.

Referring to FIG. 4, when a failure has occurred in the EMB braking device 100, the braking force generating unit 150 may generate braking force by emergency braking driving force generated by the emergency braking driving unit 200.

More specifically, the third gear 210 may be rotated by emergency braking driving force generated by the emergency braking driving unit 200. Since the first gear 111 of the braking force generating unit 150 is connected to the third gear 210, the third gear 210 and the first gear 111 may rotate together to receive emergency braking driving force of the emergency braking driving unit 200. The braking force generating unit 150 may generate braking force by pressing the pressing unit 140 against a brake disk using the emergency braking driving force transmitted through the first gear 111.

Here, the second gear 121 of the EMB driving unit 110 connected to the first gear 111 may rotate without load. That is, the second gear 121 may rotate according to the rotation of the third gear 210 rotated by the emergency braking driving force of the third gear 210.

The EMB emergency braking device may rotate the first gear 111 of the braking force generating unit 150 using one of the second gear 121 of the EMB driving unit 110 or the third gear 210 of the emergency braking driving unit 200, to transmit driving force of the EMB driving unit 110 or emergency braking driving force of the emergency braking driving unit 200 to the braking force generating unit 150. The braking force generating unit 150 may generate braking force by pressing the pressing unit 140 against a brake disc using the driving force of the EMB driving unit 110 transmitted through the first gear 111 or the emergency braking driving force of the emergency braking driving unit 200.

Here, the other of the second gear 121 of the EMB driving unit 110 or the third gear 210 of the emergency braking driving unit 200, not transmitting driving force to the braking force generating unit 150 may rotate without load according to the rotation of the first gear 111.

Figure 5:
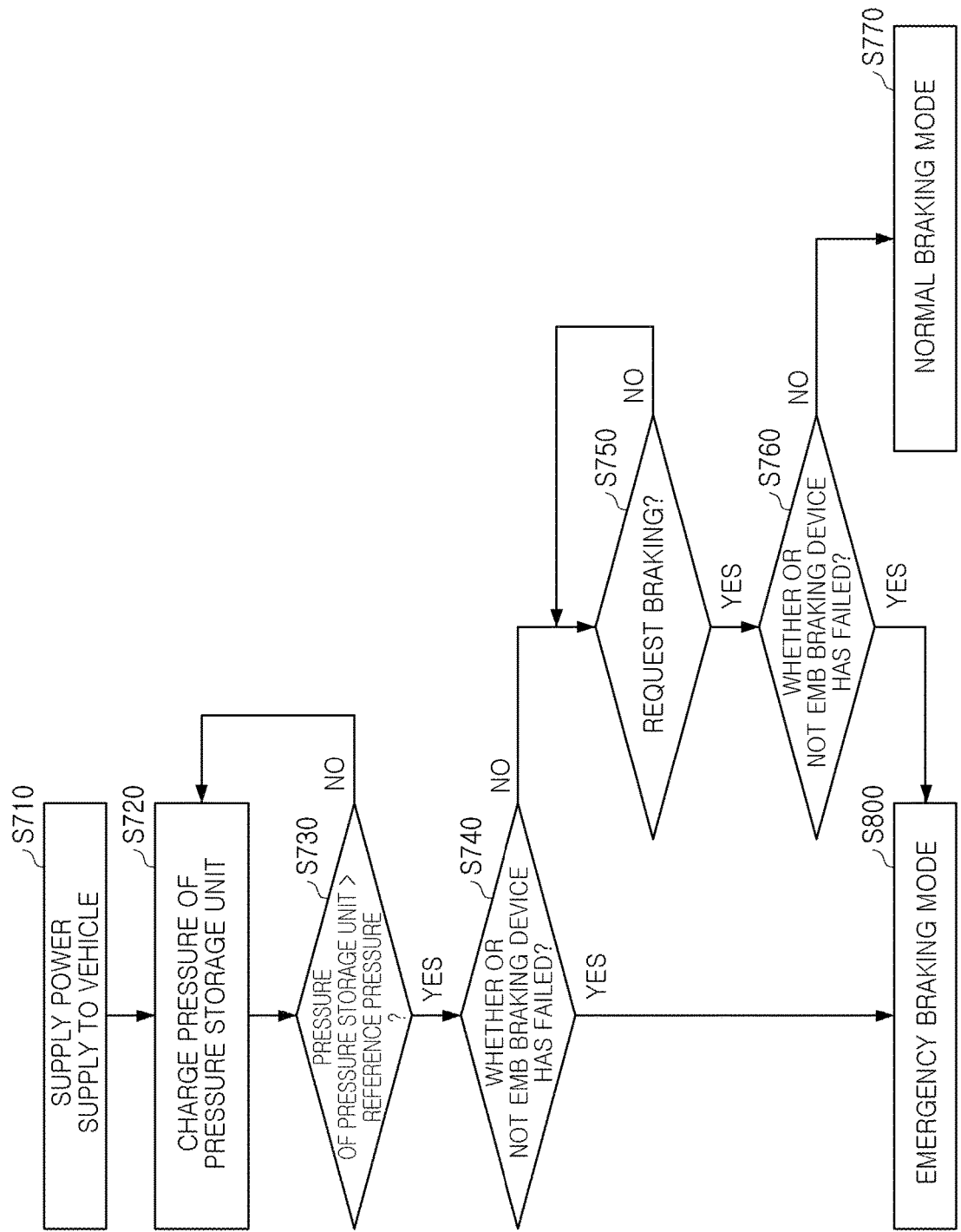
FIG. 5 is a flowchart of the EMB emergency braking method until an EMB emergency braking mode is initiated according to an embodiment of the present disclosure.
Figure 6:
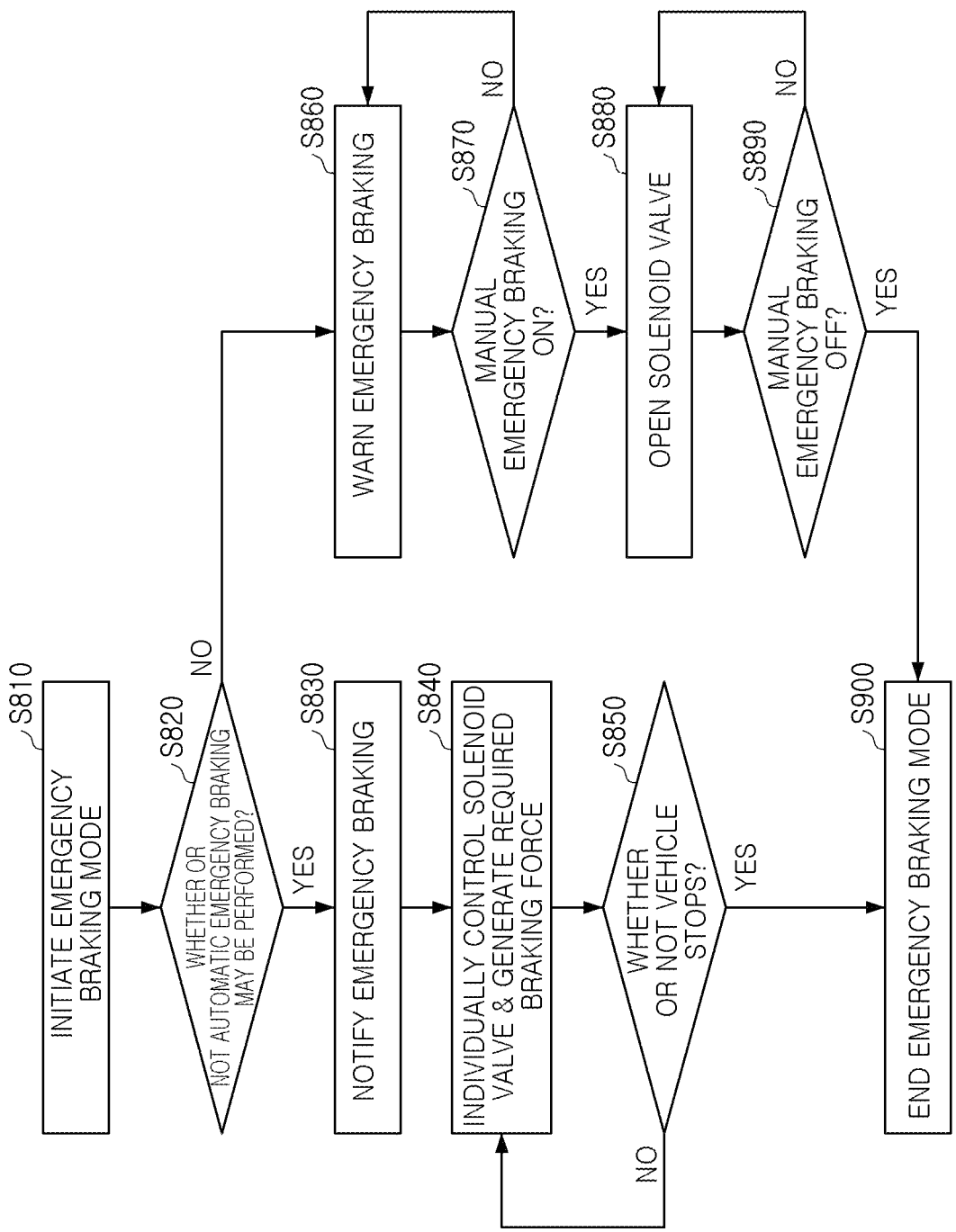
FIG. 6 is a flowchart of an EMB emergency braking mode in the EMB emergency braking method according to an embodiment of the present disclosure.

FIG. 5 is a flowchart until before an EMB emergency braking mode is initiated in an EMB braking method according to an embodiment of the present disclosure, and FIG. 6 is a flowchart of an EMB emergency braking mode, in an EMB braking method according to an embodiment of the present disclosure.

Referring to FIG. 5, the EMB emergency braking method may be initiated by supplying power supply to a vehicle (S710).

For example, when a user starts the vehicle, the EMB emergency braking method may be initiated. The EMB emergency braking method should be able to generate braking force using an EMB braking device 100 at any time when the EMB braking device 100 does not operate normally.

Therefore, the EMB emergency braking method may be prepared to perform EMB emergency braking at any time simultaneously with supplying power to the vehicle.

In the EMB emergency braking method, when power is supplied to the vehicle, pressure may be charged in a pressure storage unit 300 (S720). For example, the EMB emergency braking method may charge the pressure storage unit 300 with a pressure higher than a preset pressure in the pressure storage unit 300 by using a compressor (not shown) provided in the vehicle. Here, the preset pressure may be referred to as a reference pressure.

The pressure storage unit 300 may store a pressure equal to or higher than a reference pressure. When a failure has occurred in the EMB braking device 100, the pressure charged in the pressure storage unit 300 can be immediately supplied to an emergency braking drive unit 200, and the emergency braking driving unit 200 may generate braking force by transmitting emergency braking driving force to the braking force generating unit 150.

In the EMB emergency braking method, pressure of a pressure storage unit 300 may be compared, and the pressure of the pressure storage unit 300 may be charged in the pressure storage unit 300 until the pressure of the pressure storage unit 300 becomes equal to or higher than a reference pressure (S730).

When the pressure of the pressure storage unit 300 is charged to a level equal to or higher than the reference pressure, the EMB emergency braking method may determine whether the EMB braking device 100 has failed (S740).

The EMB emergency braking method may perform an emergency braking mode when a failure has occurred in the EMB braking device 100 (S800).

Here, the emergency braking mode may be a mode in which braking force is generated by emergency braking driving force of emergency braking driving. Meanwhile, a normal braking mode is a braking mode in a state in which the EMB braking device 100 is normally operating, and may be a mode in which braking force is generated by the driving force of the EMB driving unit 110.

In the EMB emergency braking method, if a failure has not occurred in the EMB braking device 100, it may be checked whether there is a braking request (S750). Here, the braking request may be a user's braking request, and may be confirmed through whether a user manipulates a brake pedal, that is, through brake pedal stroke information.

In the EMB emergency braking method, when there is a braking request, the EMB emergency braking method may determine whether the EMB braking device 100 has failed (S760).

When a failure has occurred in the EMB braking device 100, the EMB emergency braking method may perform an emergency braking mode (S800).

Alternatively, when a failure has not occurred in the EMB braking device 100, the EMB emergency braking method may perform a normal braking mode (S770).

Referring to FIG. 6, an EMB emergency braking mode will be described in detail.

When the emergency braking mode is initiated, it can be determined whether or not automatic emergency braking may be performed (S820).

Here, whether or not automatic emergency braking may be performed can be determined by whether or not the automatic emergency braking unit 600 is operating normally. For example, when a problem occurs in an entire power supply of a vehicle, the automatic emergency braking unit 600 may not operate normally.

When automatic emergency braking may be performed, the EMB emergency braking method may perform automatic emergency braking.

Here, the automatic emergency braking may be performed by controlling the emergency braking driving force by adjusting the solenoid valve 400 using the automatic emergency braking unit 600, to stably drive by stopping a vehicle or adjusting the braking force using the EMB braking device 100 in which a failure has occurred.

The EMB emergency braking method may notify a user that failure occurrence information of the EMB braking device 100 and automatic emergency braking are performed through a display unit 620 (S830).

For example, when automatic emergency braking is performed, by using a display provided on a control cluster of a vehicle or audio of the vehicle, a message such as "a failure has occurred in the vehicle's braking system, EMB emergency braking is currently being performed," and the like, may be displayed or EMB emergency braking information may be notified to the user through voice.

The automatic emergency braking unit 600 may control a solenoid valve 400 connected to the EMB braking device 100 in which a failure has occurred, and generate required braking force using the emergency braking driving unit 200 connected to the solenoid valve 400 (S840).

Here, the required braking force may be braking force to be generated in the EMB braking device in which the failure has occurred.

The automatic emergency braking unit 600 may receive, from an EMB controller, the EMB braking device 100 in which a failure has occurred and required braking force to be generated in the EMB braking device 100 in which a failure has occurred. Here, the required braking force may be braking force to be generated in the EMB braking device 100 in which a failure has occurred received from the EMB controller.

The automatic emergency braking unit 600 may determine the EMB braking device 100 in which a failure has occurred among the EMB braking devices 100 provided on each wheel through the EMB controller. For example, there may be a serial number for each EMB braking device 100 provided on each wheel, and may receive the serial number of the EMB braking device 100 from the EMB controller and determine a location of the EMB braking device 100 in which a failure has occurred.

The EMB emergency braking method may perform automatic emergency braking until the vehicle stops (S850).

The EMB emergency braking method may end an emergency braking mode when the vehicle stops (S900).

When automatic emergency braking may not be performed, the EMB emergency braking method may perform manual emergency braking (S820).

Here, the manual emergency braking may be emergency braking in which emergency braking is performed by opening the solenoid valve 400 according to a user's input.

As manual emergency braking requires manipulation of an input unit 500 by the user, an emergency braking warning may be performed using a display unit 620 (S860). Manual emergency braking may warn the user of a failure of the EMB braking device 100 through the display unit 620, and induce the user to operate the input unit 500.

For example, when manual emergency braking is performed, a user may be warned of danger through messages such as "a braking device of this vehicle is not operating normally, and automatic emergency braking may not be performed. Please quickly perform emergency braking by pressing the EMB emergency braking button." or the like, using a display provided in a control cluster of a vehicle or audio of the vehicle, and it may be induced until manual emergency braking is input (ON) through the user's manipulation of the input unit 500.

Here, the display unit 620 may receive power from a separate power supply unit 630. Even when an electrical problem occurs in the vehicle as a whole, in the EMB emergency braking method, manual emergency braking may be induced to a user through a display unit 620 connected to the separate power supply unit 630.

Warning of emergency braking may continue until the user inputs manual emergency braking (S870).

When the user inputs manual emergency braking through the input unit 500, in the EMB emergency braking method, a solenoid valve 400 may be opened, and the emergency braking driving unit 200 receiving pressure through the opened solenoid valve 400 may generate braking force by driving the braking force generating unit 150 (S880).

In the manual emergency braking, the emergency braking mode may be ended when the user manipulates the input unit 500 again to turn off the manual emergency braking (S890).

The EMB emergency braking device according to an embodiment of the present disclosure may generate braking force using the braking force generating unit 150 of the EMB braking device 100 even when a failure has occurred in the EMB braking device 100, thereby improving stability of the vehicle.

In particular, the EMB emergency braking device according to an embodiment of the present disclosure may generate braking force using a power source (pressure of fluid), different from that of the EMB braking device 100, so that even an electrical problem occurs in the entire vehicle, so that the EMB emergency braking device may be stopped safely.

The methods according to the present invention may be implemented in a form of program instructions that can be executed by various computer means and recorded on a computer readable medium. The computer readable medium may include program instructions, data files, data structures, or the like, alone or in combination thereof. Program instructions recorded on a computer readable medium may be specially designed and configured for the present invention, or may be known and usable to those skilled in the art of computer software.

Examples of computer readable media include hardware devices specially configured to store and execute program instructions, such as ROM, RAM, flash memory, and the like. Examples of program instructions include high-level language codes that can be executed by a computer using an interpreter, or the like as well as machine language codes such as those produced by a compiler. The hardware device described above may be configured to operate with at least one software module to perform the operations of the present invention, and vice versa.

As set forth above, according to an embodiment of the present disclosure, in an EMB emergency braking device and an emergency braking method according to an embodiment of the present disclosure, emergency braking of a vehicle may be performed even when the EMB system is in an operable state, so that stability of the EMB may be improved.

The aforementioned description merely illustrates the technical concept of the present disclosure, and a person skilled in the art to which the present invention pertains may make various modifications and modifications without departing from the essential characteristics of the present disclosure.

Therefore, the example embodiments disclosed in this specification and drawings are not intended to limit but to explain the technical concept of the present disclosure, and the scope of the technical idea of the present disclosure is not limited by these example embodiments. The scope of protection of the present disclosure should be interpreted by the following claims, and all technical ideas within the scope equivalent thereto should be interpreted as being included in the scope of the present disclosure.

What is claimed is:

1. An electro mechanical brake (EMB) emergency braking device for a vehicle, the EMB emergency braking device comprising:
    an EMB driving unit configured to generate driving force;
    an emergency braking driving unit configured to generate emergency braking driving force; and
    a braking force generating unit configured to generate braking force by receiving one of the driving force or the emergency braking driving force,
    wherein the EMB driving unit and the emergency braking driving unit generate the driving force or the emergency braking driving force from different power sources.

2. The electromechanical brake (EMB) emergency braking device of claim 1, wherein the EMB driving unit generates the driving force using electrical energy as a power source, and
    the emergency braking driving unit generates the emergency braking driving force by using pressure of fluid stored in a pressure storage unit.

3. The electromechanical brake (EMB) emergency braking device of claim 1, wherein the EMB driving unit is an electric motor, and the emergency braking driving unit comprises a pneumatic actuator.

4. The electromechanical brake (EMB) emergency braking device of claim 1, wherein the braking force generating unit comprises a power transmission unit connected to the EMB driving unit and the emergency braking driving unit.

5. The electromechanical brake (EMB) emergency braking device of claim 4, wherein the braking force generating unit comprises a power transmission unit receiving one of the driving force or the emergency braking driving force from the EMB driving unit or the emergency braking driving unit.

6. The electromechanical brake (EMB) emergency braking device of claim 4, wherein the power transmission unit is directly connected to the EMB driving unit and the emergency braking driving unit, and the EMB driving unit and the emergency braking driving unit are not directly connected.

7. The electromechanical brake (EMB) emergency braking device of claim 4, wherein the power transmission unit is rotated by one of the EMB driving unit or the emergency braking driving unit, and the other of the EMB driving unit or the emergency braking driving unit rotates without load according to the rotation of the power transmission unit.

8. The electromechanical brake (EMB) emergency braking device of claim 1, wherein:
    a pressure storage unit storing pressure of fluid;
    a solenoid valve provided between the pressure storage unit and the emergency braking driving unit;
    an input unit receiving a 'user's desire to undertake emergency braking; and
    an automatic emergency braking unit controlling the pressure of fluid transmitted to the emergency braking driving unit by controlling the solenoid valve, are included,
    wherein the solenoid valve is controlled by the input unit or the automatic emergency braking unit.

9. The electromechanical brake (EMB) emergency braking device of claim 8, further comprising:
    a receiving unit receiving at least one of brake pedal stroke information, whether or not EMB braking devices provided in a vehicle have failed, a location of the EMB braking device that has failed, and required braking force to be generated by the EMB braking device that has failed,
    wherein the required braking force is braking force to be generated in the EMB braking device in which the failure has occurred received from an EMB controller.

10. The electromechanical brake (EMB) emergency braking device of claim 9, wherein the automatic emergency braking unit generates the required braking force to a wheel provided with the EMB braking device in which a failure has occurred, by controlling the emergency braking driving unit by controlling the solenoid valve.

11. The electromechanical brake (EMB) emergency braking device of claim 1, further comprising:
    a display unit visually or audibly conveying information to a user about whether or not the EMB braking device has failed.

12. The electromechanical brake (EMB) emergency braking device of claim 11, further comprising:
    a power supply unit supplying power so that the display unit visually or audibly conveys the information to the user about whether or not the EMB braking device has failed.

13. The electromechanical brake (EMB) emergency braking device of claim 12, wherein the EMB driving unit operates by receiving power, other than the power of the power supply unit.

14. A vehicle comprising the electromechanical brake (EMB) emergency braking device of claim 1.

15. An electromechanical brake (EMB) emergency braking method comprising steps of:
    confirming whether or not an electromechanical brake (EMB) braking device has failed; and
    generating braking force using an EMB driving unit, or generating braking force using an emergency braking driving unit, according to whether or not the electromechanical brake (EMB) braking device has failed, wherein generating the braking force is performed in at least one of an automatic emergency braking mode or a manual emergency braking mode, and the emergency braking driving unit is operable using pressure of fluid.

16. The electromechanical brake (EMB) emergency braking method of claim 15, wherein the automatic emergency braking mode further comprises an operation of receiving vehicle driving information, in the operation of performing the emergency braking, wherein the driving information includes at least one of stroke information of a brake pedal, whether or not EMB braking devices provided in the vehicle have failed, a location of the EMB braking device that has failed, and required braking force to be generated by the EMB braking device that has failed.

17. The electromechanical brake (EMB) emergency braking method of claim 16, wherein the automatic emergency braking mode generates the required braking force in the EMB braking device in which the failure has occurred using the emergency braking driving unit, based on the driving information.

18. The electromechanical brake (EMB) emergency braking method of claim 15, wherein the manual emergency braking mode, in an operation of performing emergency braking, further comprises operations of:

notifying a user of emergency braking information; and receiving a 'user's desire to brake, wherein when the user's desire to brake is received, braking force is immediately generated using the emergency braking driving unit.

19. The electromechanical brake (EMB) emergency braking method of claim 18, wherein the operation of notifying a user of the emergency braking information is performed by a display unit receiving power from a power supply unit not supplying power to the EMB driving unit, and displaying the emergency braking information to the user.

20. The electro mechanical brake (EMB) emergency braking method of claim 15, further comprising an emergency braking preparation operation of charging and storing pressure of fluid in a pressure storage unit up to a preset pressure, when a vehicle is started.

* * * * *